United States Patent
Taibi et al.

(10) Patent No.: US 10,161,341 B2
(45) Date of Patent: Dec. 25, 2018

(54) CONTROL SYSTEM FOR DIAGNOSING A MALFUNCTIONING OF A PRESSURE SENSOR INCLUDED IN AN AFTERTREATMENT SYSTEM OF AN INTERNAL COMBUSTION ENGINE

(71) Applicant: GM GLOBAL TECHNOLOGY OPERATIONS LLC, Detroit, MI (US)

(72) Inventors: Cristian Taibi, Turin (IT); Francesco Siano, Givoletto (IT)

(*) Notice: Subject to any disclaimer, the term of this patent is extended or adjusted under 35 U.S.C. 154(b) by 252 days.

(21) Appl. No.: 15/156,886

(22) Filed: May 17, 2016

(65) Prior Publication Data
US 2016/0341142 A1  Nov. 24, 2016

(30) Foreign Application Priority Data

May 19, 2015 (DE) .................... 20 2015 003 616 U

(51) Int. Cl.
| | |
|---|---|
| F02D 41/22 | (2006.01) |
| F01N 3/021 | (2006.01) |
| F02D 9/06 | (2006.01) |
| F01N 11/00 | (2006.01) |
| F01N 9/00 | (2006.01) |

(52) U.S. Cl.
CPC .......... *F02D 41/222* (2013.01); *F01N 3/021* (2013.01); *F01N 9/002* (2013.01); *F01N 11/002* (2013.01); *F02D 9/06* (2013.01); *F01N 2260/14* (2013.01); *F01N 2560/08* (2013.01); *F01N 2900/0416* (2013.01); *F01N 2900/08* (2013.01); *F01N 2900/1406* (2013.01); *F01N 2900/1606* (2013.01); *Y02T 10/20* (2013.01); *Y02T 10/47* (2013.01)

(58) Field of Classification Search
CPC ................................. F02D 41/222; F02D 9/06
USPC .......................................................... 73/1.57
See application file for complete search history.

(56) References Cited

FOREIGN PATENT DOCUMENTS

| DE | 102010030633 A1 | 12/2011 |
|---|---|---|
| DE | 102011003748 A1 | 8/2012 |
| WO | 2013165300 A2 | 11/2013 |

OTHER PUBLICATIONS

German Patent Office, German Search Report for German Application No. 202015003616.3, dated Dec. 16, 2015.

*Primary Examiner* — John Fitzgerald
*Assistant Examiner* — Rodney T Frank
(74) *Attorney, Agent, or Firm* — Lorenz & Kopf, LLP

(57) ABSTRACT

A system and method is disclosed for diagnosing a malfunctioning of a pressure sensor in an aftertreatment system of an internal combustion engine. A first value of a differential pressure across the particulate filter is measured during the identified fuel cut-off state of the internal combustion engine. An exhaust back pressure valve of the aftertreatment system is operated toward a predetermined closed position thereof, and a second value of a differential pressure across the particulate filter is measured. A difference between the second value and the first value is calculated, and a malfunctioning of the differential pressure sensor is identified when the calculated difference is higher than a predetermined threshold value thereof.

14 Claims, 2 Drawing Sheets

CONTROL SYSTEM FOR DIAGNOSING A MALFUNCTIONING OF A PRESSURE SENSOR INCLUDED IN AN AFTERTREATMENT SYSTEM OF AN INTERNAL COMBUSTION ENGINE

CROSS-REFERENCE TO RELATED APPLICATION

This application claims priority to German Patent Application No. 202015003616.3, filed May 19, 2015, which is incorporated herein by reference in its entirety.

TECHNICAL FIELD

The present disclosure pertains to a control system for diagnosing a malfunctioning of a pressure sensor included in an aftertreatment system of an internal combustion engine, such as a Diesel engine of a motor vehicle.

BACKGROUND

It is known that an internal combustion engine of a motor vehicle may be equipped with an aftertreatment system designed to change the composition of the exhaust gas in order to reduce the combustion by-products in the exhaust gas. Some aftertreatment systems may include a particulate filter, for example a Diesel particulate filter (DPF) designed to trap diesel particulate matter or soot contained in the exhaust gas.

During the lifetime of the DPF, the efficiency of this component may be monitored using a differential pressure sensor suitable to sense the differential pressure of the exhaust gas upstream of the DPF and downstream of the DPF. In particular, when a measured differential pressure becomes lower than a threshold value thereof, DPF may be detected as inefficient or, in other words, unsuitable to efficiently trap the soot matter and a malfunctioning of the DPF may be identified.

Generally, the differential pressure sensor is connected with two sensing points, the first located upstream of the DPF and the second located downstream of the DPF, by means of respective pipes. It is observed that, if a disconnection of the pipe connecting the differential pressure sensor with the second sensing point occurs, the measured differential pressure is always higher than the threshold value and, therefore, even if the DPF does not efficiently trap the soot matter, the malfunctioning of the DPF cannot be identified.

In most internal combustion engines a disconnection of the pipes is a rare event, caused in general by a tampering or a wrong service repair, but when the aftertreatment system layout of the ICE is equipped with an exhaust back pressure valve having an exhaust brake function, the possibility to observe disconnections, in particular of the pipe connecting the differential pressure sensor with the second sensing point located downstream of the DPF, increases, also during the ICE working conditions.

As a matter of fact the closure of the exhaust back pressure valve during the ICE working conditions may stress the pipe connections, in particular of the pipe connecting the differential pressure sensor with the second sensing point, due to the increasing pressure so-called back pressure) in the aftertreatment system caused by the closure of the exhaust back pressure valve.

SUMMARY

The present disclosure provides a simple, rational and relatively inexpensive solution for identifying when a pressure sensor, namely a differential pressure sensor, becomes unable to sense the correct differential pressure across the particulate filter, thereby allowing the adoption of countermeasures that can prevent the above mentioned side effects.

An embodiment of the disclosure provides a control system for diagnosing a malfunctioning of a pressure sensor included in an aftertreatment system of an internal combustion engine. The aftertreatment system includes an exhaust gas line, a particulate filter located in the exhaust gas line, a differential pressure sensor sensing a differential pressure of the exhaust gas upstream and downstream of the particulate filter and an exhaust back pressure valve located in the exhaust gas line downstream of the particulate filter. An electronic control unit is configured to identify when the internal combustion engine is running under a fuel cut-off state and measure a first value of a differential pressure across the particulate filter during the identified fuel cut-off state. The electronic control unit operates the exhaust back pressure valve, after the determination of the first value, toward a predetermined closed position thereof and measures a second value of a differential pressure across the particulate filter while the exhaust back pressure valve is in the predetermined closed position. The electronic control unit calculates a difference between the second value and the first value and identifies a malfunctioning of the differential pressure sensor, if the calculated difference is higher than a predetermined threshold value thereof.

This control system is based on the fact that, if the pipe connection, which connects the differential pressure sensor to its sensing point located downstream of the particulate filter, is disconnected, the differential pressure sensor senses a high differential pressure, independently from the efficiency to trap the soot matter of the particulate filter.

By looking at the values of the differential pressure across the particulate filter, during an engine fuel cut-off state, in a first instant when the exhaust back pressure valve is open and in a second instant when the exhaust back pressure valve is closed, the control system represents a simple and reliable solution for identifying that a malfunctioning of the pipe connection which connects the differential pressure sensor to its sensing point located downstream of the particulate filter is occurring.

According to an embodiment, the electronic control unit may be configured to determine the first value provided that an enabling engine condition is fulfilled. Preferably, the enabling engine condition may be fulfilled if a volumetric flow rate of the exhaust gas is greater than a predetermined threshold value thereof. The volumetric flow rate of the exhaust gas is a physical parameter affecting pressure drop into the exhaust gas line, in this way, the measurement of the calculated difference becomes more reliable and the entire system more efficient, because undesired disturbances are suppressed.

As an alternative, the enabling engine condition may be fulfilled if an engine speed is greater than a predetermined threshold value thereof. In this way, the measurement of the calculated difference becomes more reliable and the entire system more efficient, because undesired disturbances are suppressed.

According to an embodiment of the present disclosure, the predetermined closed position of the exhaust back pressure valve may depend on a pressure value of the exhaust gas downstream of the exhaust back pressure valve. This aspect of the solution may reduce the probability of false identifications, thereby improving the reliability of the diagnostic system.

According to an aspect of the present disclosure, the predetermined threshold value of the calculated difference may depend on a volumetric flow rate of exhaust gas. As an alternative, the predetermined threshold value of the calculated difference may depend on engine speed. In this way the threshold value of the calculated difference can change allowing the diagnostic control system to be efficiently performed also under transient operating conditions of the engine. In particular, it is observed that the value of calculated difference is proportional to the engine speed and/or to the volumetric flow rate of the exhaust gas.

According to a further embodiment, the electronic control unit may be configured to generate a signal perceivable by a driver if the malfunctioning is identified. In this way the driver may be informed of the malfunctioning of the pressure sensors and that a service intervention is needed.

The present solution may be alternatively embodied as a method of diagnosing a malfunctioning of a pressure sensor included in an aftertreatment system of an internal combustion engine. The aftertreatment system includes an exhaust gas line, a particulate filter located in the exhaust gas line, a differential pressure sensor sensing a differential pressure of the exhaust gas upstream and downstream of the particulate filter and an exhaust back pressure valve located in the exhaust gas line downstream of the particulate filter. The method includes identifying when the internal combustion engine is running under a fuel cut-off state, and measuring, during the identified fuel cut-off state, a first value of a differential pressure across the particulate filter. The exhaust back pressure valve is operated operating after the determination of the first value, toward a predetermined closed position thereof, and a second value of a differential pressure across the particulate filter is measured, while the exhaust back pressure valve is in the predetermined closed position. A difference between the second value and the first value is calculated, and a malfunctioning of the differential pressure sensor is identified if the calculated difference is higher than a predetermined threshold value thereof.

This embodiment achieves basically the same effects of the system described above particularly that of providing a simple and reliable solution for identifying that a malfunctioning of the pipe connection which connects the differential pressure sensor to its sensing point located downstream of the particulate filter is occurring.

According to an embodiment, the method may include determining the first value provided that an enabling engine condition is fulfilled. Preferably the enabling engine condition may be fulfilled if a volumetric flow rate of the exhaust gas is greater than a predetermined threshold value thereof. The volumetric flow rate of the exhaust gas is a physical parameter affecting pressure drop into the exhaust gas line, in this way, the measurement of the calculated difference becomes more reliable and the entire system more efficient, because undesired disturbances are suppressed.

As an alternative, the enabling engine condition may be fulfilled if an engine speed is greater than a predetermined threshold value thereof. In this way, the measurement of the calculated difference becomes more reliable and the entire system more efficient, because undesired disturbances are suppressed.

According to an embodiment of the present disclosure, the predetermined closed position of the exhaust back pressure valve may depend on a pressure value of the exhaust gas downstream of the exhaust back pressure valve. This aspect of the solution may reduce the probability of false identifications, thereby improving the reliability of the diagnostic system.

According to an aspect of the present disclosure, the predetermined threshold value of the calculated difference may depend on a volumetric flow rate of exhaust gas. As an alternative, the predetermined threshold value of the calculated difference may depend on engine speed. In this way the threshold value of the calculated difference can change allowing the diagnostic system to be efficiently performed also under transient operating conditions of the engine. In particular, it is observed that the value of calculated difference is proportional to engine speed and/or to the volumetric flow rate of the exhaust gas.

According to a further embodiment, the method may include generating a signal perceivable by a driver if the malfunctioning is identified. In this way the driver may be informed of the malfunctioning of the pressure sensors and that a service intervention is needed.

The proposed solution may be carried out with the help of a computer program including a program-code for carrying out the method described above, and in the form of a computer program product including the computer program. The method can be also embodied as an electromagnetic signal, the signal being modulated to carry a sequence of data bits which represent a computer program to carry out all steps of the method.

Another embodiment of the solution provides an automotive system including an internal combustion engine and an aftertreatment system. The aftertreatment system includes an exhaust gas line, a particulate filter located in the exhaust gas line, a differential pressure sensor sensing a differential pressure of the exhaust gas upstream and downstream of the particulate filter and an exhaust back pressure valve located in the exhaust gas line downstream of the particulate filter. An electronic control unit or other means is configured to identify when the internal combustion engine is running under a fuel cut-off state, and measure a first value of a differential pressure across the particulate filter. The electronic control unit or other means is also configured to operate the exhaust back pressure valve toward a predetermined closed position thereof after the determination of the first value, and measure a second value of a differential pressure across the particulate filter while the exhaust back pressure valve is in the predetermined closed position. The electronic control unit or other means is also configured to calculate a difference between the second value and the first value, and identify a malfunctioning of the differential pressure sensor, if the calculated difference is higher than a predetermined threshold value thereof.

This embodiment achieves basically the same effects of the method and the system described above, particularly that of providing a simple and reliable solution for identifying that a malfunctioning of the pipe connection which connects the differential pressure sensor to its sensing point located downstream of the particulate filter is occurring.

According to an embodiment, the automotive system, and more particularly the electronic control unit or other means may be configured to determine the first value provided that an enabling engine condition is fulfilled. Preferably the enabling engine condition may be fulfilled if a volumetric flow rate of the exhaust gas is greater than a predetermined threshold value thereof. The volumetric flow rate of the exhaust gas is a physical parameter affecting pressure drop into the exhaust gas line, in this way, the measurement of the calculated difference becomes more reliable and the entire system more efficient, because undesired disturbances are suppressed.

As an alternative, the enabling engine condition may be fulfilled if an engine speed is greater than a predetermined threshold value thereof. In this way, the measurement of the calculated difference becomes more reliable and the entire system more efficient, because undesired disturbances are suppressed.

According to an embodiment of the present disclosure, the predetermined closed position of the exhaust back pressure valve may depend on a pressure value of the exhaust gas downstream of the exhaust back pressure valve. This aspect of the solution may reduce the probability of false identifications, thereby improving the reliability of the diagnostic system.

According to an aspect of the present disclosure, the predetermined threshold value of the calculated difference may depend on a volumetric flow rate of exhaust gas. As an alternative, the predetermined threshold value of the calculated difference may depend on engine speed. In this way the threshold value of the calculated difference can change allowing the diagnostic system to be efficiently performed also under transient operating conditions of the engine. In particular, it is observed that the value of calculated difference is proportional to engine speed and/or to the volumetric flow rate of the exhaust gas.

According to a further embodiment, the automotive system, and more particularly the electronic control unit or other means may be configured to generate a signal perceivable by a driver if the malfunctioning is identified. In this way the driver may be informed of the malfunctioning of the pressure sensors and that a service intervention is needed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
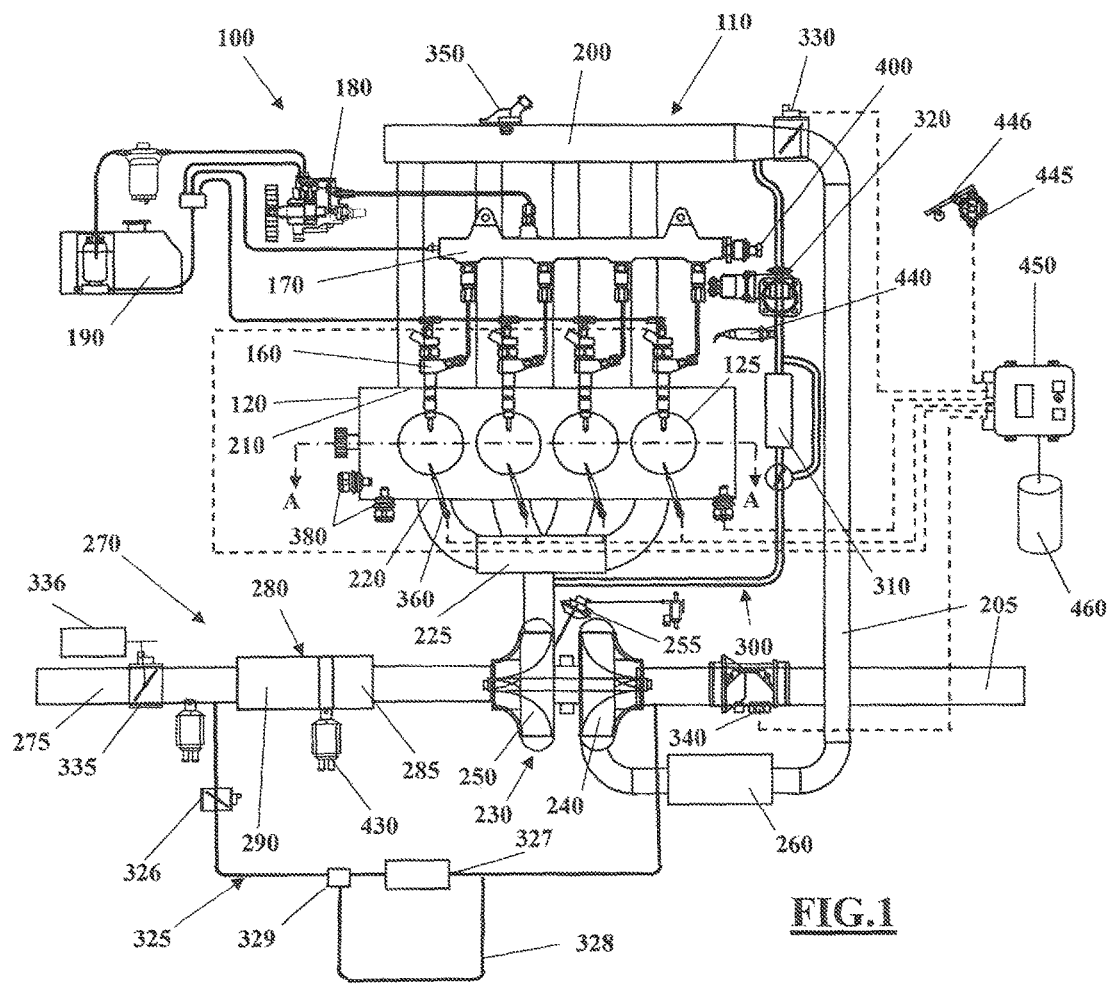
FIG. 1 shows an automotive system.
Figure 2:
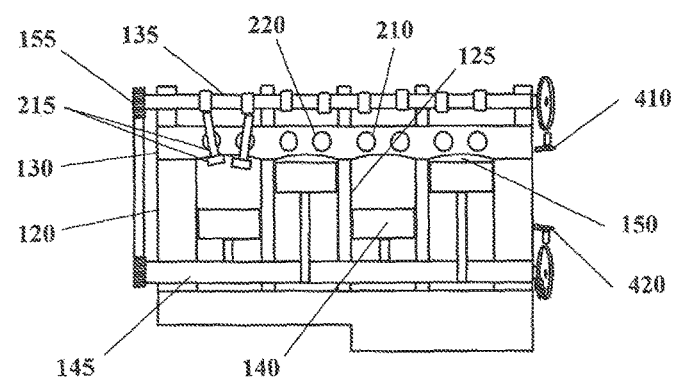
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas aftertreatment system 270. This example shows a variable geometry turbine (VGT) 250 with a VGT actuator 255 arranged to move the vanes to alter the flow of the exhaust gases through the turbine 250.

The exhaust gas aftertreatment system 270 may include an exhaust gas line 275 having one or more exhaust aftertreatment devices 280. The aftertreatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC) 285, lean NOx traps, hydrocarbon adsorbers, selective catalytic reduction (SCR) systems, and particulate filters, in particular a Diesel Particulate Filter (DPF) 290 located in the exhaust line 275 downstream of the DOC 285.

Other embodiments may include an exhaust gas recirculation (EGR) duct 300 coupled between the exhaust manifold 225 and the intake manifold 200. The EGR duct 300 may include an EGR cooler 310 to reduce the temperature of the exhaust gases in the EGR duct 300. An EGR valve 320 regulates a flow of exhaust gases in the EGR duct 300.

Still other embodiments (FIG. 1) may include a low pressure EGR system 325 (LP-EGR) characterized by a "long route" of the exhaust gases. In this case an additional low pressure EGR valve 326 will recirculate the exhaust gases downstream of the aftertreatment devices 280 towards the compressor 240 inlet. Moreover, a low pressure EGR-cooler 327 can be provided, together with a cooler by-pass circuit 328 and a control valve 329.

At least one exhaust back pressure valve 335 is disposed on the exhaust gas line 275 downstream of the aftertreatment devices 280. When actuated, the exhaust back pressure valve 335 may obstruct or partially obstruct the flow of exhaust gas through the exhaust gas line 275. The exhaust back pressure valve 335 may be a throttle valve having a throttle body with a throttle plate located therein, which is a butterfly valve that regulates the exhaust gas flow, however other types of valves are possible. The exhaust back pressure valve 335 regulates the exhaust gas flow through the exhaust gas line 275 with an actuator 336, which rotates the throttle plate to be either parallel with the flow direction along the exhaust gas line 275, which is an open position, or perpendicular with the flow direction, which is a total closed position, or in any position therebetween, which are partial closed (or partial open) positions. In the parallel-open position, the orifice at the throttle plate has a maximum orifice area with the least flow obstruction, and in the perpendicular-closed position, the orifice at the throttle plate has a minimum orifice area with the most flow obstruction. In any intermediate partially closed/open position, the orifice at the throttle plate has an intermediate orifice area with an intermediate flow obstruction. The actuator 336 may be either hydraulically or electrically driven.

Figure 3:
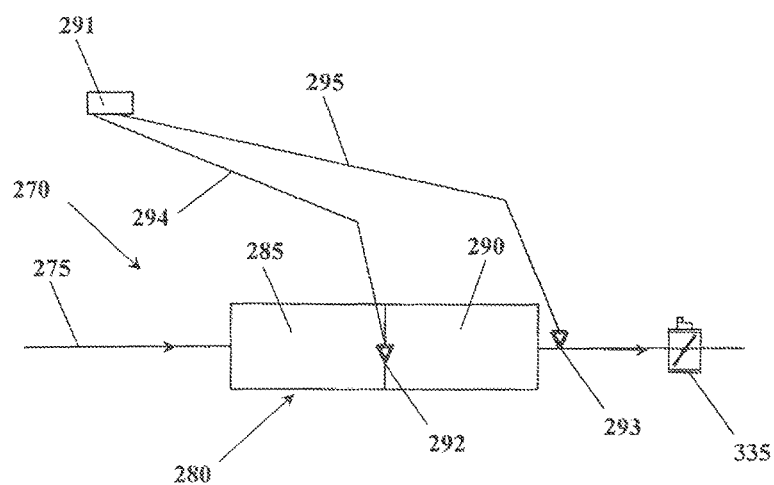
FIG. 3 is a schematic view of an exhaust gas aftertreatment system according to an embodiment of the present solution.
Figure 4:
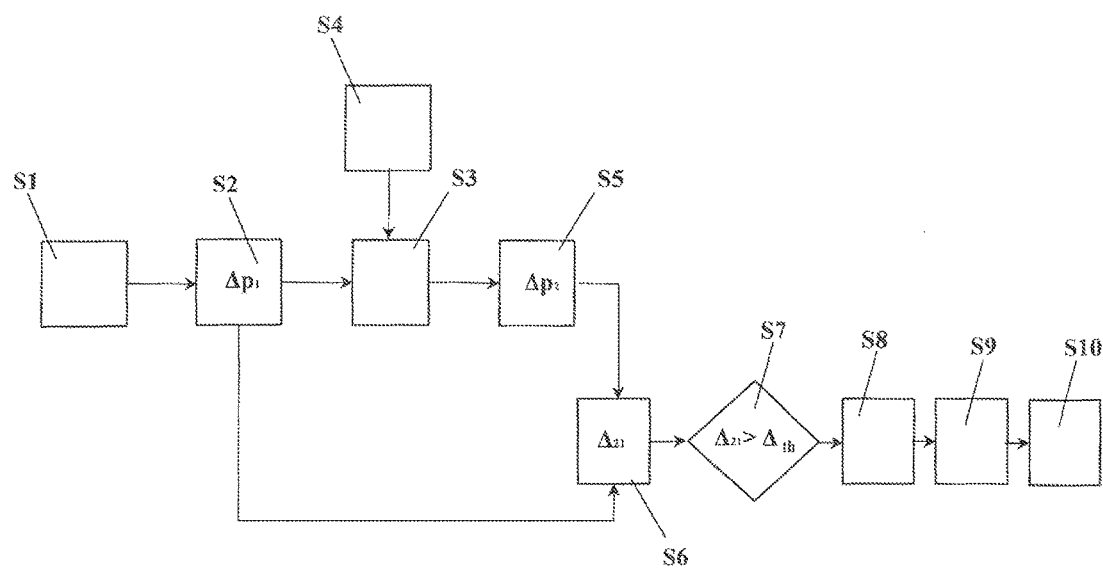
FIG. 4 is a flowchart representing a strategy of diagnosing a malfunctioning of a differential pressure sensor located in the exhaust gas aftertreatment system of FIG. 3.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, an accelerator pedal position sensor 445, and a differential pressure sensor 291, located in the exhaust line 275 and suitable to measure the differential pressure values between the pressure value upstream of the DPF 290, for example between the DOC 285 and the DPF 290 (see FIG. 3), and downstream of the DPF 290, for example between the DPF 290 and the exhaust back pressure valve 335 (see FIG. 1). For example, the differential pressure sensor 291 may be located in a remote place with respect of its sensing points 292,293 which are located into the exhaust gas line 275 upstream of the DPF 290 and downstream of the DPF 290, respectively. The differential pressure sensor 291, in this case, is connected to a first sensing point 292 located upstream of the DPF 290 by means of a first pipe 294. A first end of the first pipe 294 is connected to the differential pressure sensor 291 and the second end of the first pipe 294 opens into the exhaust gas line 275 upstream of the DPF 290 where is defined the first sensing point 292. Moreover, the differential pressure sensor 291 is connected to a second sensing point 293 located downstream of the DPF 290 (between the DPF 190 and the exhaust back pressure valve 335) by means of a second pipe 295. A first end of the second pipe 295 is connected to the differential pressure sensor 291 and the second end of the second pipe 295 opens into the exhaust gas line 275 downstream of the DPF 290 where is defined the second sensing point 293.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, the waste gate actuator 252 and the cam phaser 155. Note, dashed lines are used to indicate communication between the ECU 450 and the various sensors and devices, but some are omitted for clarity.

Turning now to the ECU 450, this apparatus may include a digital central processing unit (CPU 460) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product or computer readable medium, the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Moreover, the ECU 450 controls the exhaust back pressure valve 335 through the actuator 336 depending on pressure and temperature conditions in the exhaust gas aftertreatment system 270.

One of the tasks of the ECU 450 may be that of executing a diagnostic strategy aimed to identify whether the differential pressure sensor 291, which is normally used to monitor the DPF 290 efficiency, is correctly connected with its sensing points 292,293, and in particular with the second sensing point 293. In particular, the ECU 450 is configured to execute this diagnostic strategy when the ICE 110 is running under a fuel cut-off state, namely a condition where the ECU 450 cuts the fuel supply off, for example when the automotive system 100 is moving and the driver releases the pressure on an accelerator pedal 446, and/or when other enabling conditions are fulfilled.

To do so, the ECU 450 may be configured to monitor the position of the accelerator pedal 446 with the accelerator pedal position sensor 445, and to identify the fuel cut-off state when the accelerator pedal 446 is completely released. In addition or as an alternative, the ECU 450 may be configured to monitor the engine working points (namely, engine speed and engine torque) and to identify the fuel cut-off state when the actual engine working point enters a pre-calibrated area of the engine speed-engine torque diagram of the ICE 110. Again, in addition or as a further alternative, the ECU 450 may be configured to monitor the amount of fuel injected by the fuel injector 160 and identify the fuel cut-off state when the fuel amount is null or substantially null.

While the ICE 110 is running under fuel cut-off state, the ECU 450 may be configured to check if a further enabling condition is fulfilled. To do so, the ECU 450 may be configured to monitor the volumetric flow rate of the exhaust gas and to execute the diagnostic strategy when the monitored volumetric flow rate of the exhaust gas is greater than a predetermined threshold value thereof, wherein the predetermined threshold value is pre-calibrated on a test bench and stored in the memory system. The volumetric flow rate of the exhaust gas may be estimated on the basis of the engine working points (namely, engine speed and engine torque). In case no exhaust gas recirculation is applied during fuel cut-off state, as an alternative, the ECU 450 may be configured to monitor the engine speed and to execute the diagnostic strategy when the monitored engine speed is greater than a predetermined threshold value thereof, wherein the predetermined threshold value is pre-calibrated on a test bench and stored in the memory system.

When the fuel cut-off state is identified (block S1) and the further enabling condition is fulfilled, the diagnostic strategy provides that the ECU 450 measures (block S2), by means of the differential pressure sensor 291, a first value $\Delta p_1$ of a differential pressure across the DPF 290 and stores the first value $\Delta p_1$ in the memory system. The measurement of the first value $\Delta p_1$ is performed when the exhaust back pressure valve 335 is in the open position or in a determined partially opened position.

After that the first value $\Delta p_1$ has been measured and stored, the diagnostic strategy provides that the ECU 450 operates (block S3) the exhaust back pressure valve 335, by means of the actuator 336, toward a predetermined closed position thereof. For example, the ECU 450 may operate the exhaust back pressure valve 335 in its totally closed position or in any of the partially closed positions thereof, wherein the exhaust back pressure valve 335 is closed more than it was during the measurement of the first value $\Delta p_1$.

The predetermined closed position of the exhaust back pressure valve 335 may depend Nock S4) on a measured or estimated pressure value of the exhaust gas, for example downstream of the exhaust back pressure valve 335. As an example, the closed position of the exhaust back pressure valve 335 may be expressed as an output of a map, pre-calibrated on a test bench and stored in the memory system, that receives as input an (actual) pressure value of the exhaust gas downstream of the exhaust back pressure valve 335.

Again, the exhaust back pressure valve 335 may be maintained in the closed position for a predetermined period of time, in which the closure of the exhaust back pressure valve 335 does not considerably influence the drivability of the automotive system 100. This predetermined period of time may be a calibration parameter and may be few seconds long.

While the exhaust back pressure valve 335 has been moved toward the closed position thereof, and an obstruction of the flow of exhaust gas through the exhaust gas line 275 is occurring, the diagnostic strategy provides that the ECU 450 measures (block S5), by means of the differential pressure sensor 291, a second value $\Delta p_2$ of a differential pressure across the DPF 290 and, for example, stores the second value $\Delta p_2$ in the memory system.

The diagnostic strategy provides, again, that the ECU 450 calculates (block S6) a difference $\Delta_{21}$ between the measured second value $\Delta p_2$ and the first value $\Delta p_1$. Then, the diagnostic strategy provides for the ECU 450 to compare (block S7) the calculated difference $\Delta_{21}$ with a threshold value $\Delta^{th}$ thereof. The threshold value $\Delta^{th}$ may be indicative of the fact that the pressure values sensed by the differential pressure sensor 291 upstream of the DPF 290 increase when the exhaust back pressure valve 335 moves from an opened position toward a closed position, whereas the pressure values sensed by the differential pressure sensor 291 downstream of the DPF 290 are independent from the pressure increase (i.e. the back pressure) caused by the closure of the exhaust back pressure valve 335.

To a certain extent the threshold value $\Delta^{th}$ may depend or may be substantial equal to the expected back pressure increasing caused by the closure extent of the exhaust back pressure valve 335 in the exhaust gas line 275 (for example upstream of the DPF 290). By way of example, the threshold value $\Delta^{th}$ may be retrieved from a calibration map stored in the memory system and may be expressed as an output of the calibration map that receives as input an (actual) position of the actuator 336 of the exhaust back pressure valve 335.

If the calculated difference $\Delta_{21}$ is higher than the threshold value $\Delta^{th}$, i.e. the pressure value sensed by the differential pressure sensor 291 downstream of the DPF 290 is substantially independent from the pressure increase (i.e. the back pressure) caused by the closure of the exhaust back pressure valve 335, an anomalous condition is met (block S8) that leads the ECU 450 to identify (block S9) that a malfunctioning of the differential pressure sensor 291, and in particular of the connection between the differential pressure sensor 291 and the second pipe 295, is occurring.

Once a malfunctioning of the differential pressure sensor 291 has been identified, the ECU 450 may be configured to perform one or more recovery actions. These recovery actions may include, but are not limited to, the generation (block S10) of a signal perceivable by a driver, for example through the activation of a display (e.g. a light) disposed in a dashboard of the automotive system 100. In this way the driver may be informed of the malfunctioning of the differential pressure sensor 291, and in particular of the connection between the differential pressure sensor 291 and the second pipe 295, and suggested to take some countermeasures, for example to go to the nearest car service center.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A system for diagnosing a pressure sensor in an aftertreatment system of an internal combustion engine, the system comprising:
   the pressure sensor that senses a differential pressure of an exhaust gas upstream and downstream from a particulate filter of the aftertreatment system; and an electronic control unit having a processor configured to:
measure a first value of the differential pressure across the particulate filter based on sensor signals received from the pressure sensor when the internal combustion engine is operating in a fuel cut-off state;
generate output signals to control an actuator to position an exhaust back pressure valve downstream of the particulate filter toward a predetermined closed position thereof;
measure a second value of the differential pressure across the particulate filter based on the sensor signals received from the pressure sensor when the exhaust back pressure valve is in the predetermined closed position;
calculate a difference between the second value and the first value; and
generate a signal that indicates a malfunction condition of the pressure sensor when the calculated difference is higher than a threshold pressure differential value.

2. The system according to claim 1, wherein the processor of the electronic control unit is further configured to measure the first value when an enabling engine condition is fulfilled.

3. The system according to claim 2, wherein the processor of the electronic control unit is further configured to determine a volumetric flow rate of the exhaust gas, and the enabling engine condition is fulfilled when the volumetric flow rate is greater than a threshold flow rate value.

4. The system according to claim 2, wherein the processor of the electronic control unit is further configured to determine an engine speed, and the enabling condition is fulfilled when the engine speed is greater than a threshold engine speed value.

5. The system according to claim 1, wherein the processor of the electronic control unit is configured to:
determine a pressure value of the exhaust gas downstream of the exhaust back pressure valve; and
generate the output signals to control the actuator to position the exhaust back pressure valve based on the pressure value.

6. The system according to claim 1, wherein the processor of the electronic control unit is further configured to determine a volumetric flow rate of the exhaust gas, and the threshold pressure differential value is based on the volumetric flow rate of the exhaust gas.

7. The system according to claim 1, wherein the processor of the electronic control unit is further configured to determine an engine speed, and the threshold pressure differential value is based on engine speed.

8. A method for diagnosing a pressure sensor in an aftertreatment system of an internal combustion engine, the method comprising:
measuring, by a processor based on sensor signals received from the pressure sensor, a first value of a differential pressure across a particulate filter when the internal combustion engine is operating in a fuel cut-off state;
controlling, by the processor, an actuator to position an exhaust back pressure valve downstream of the particulate filter toward a predetermined closed position thereof;
measuring, by the processor based on the sensor signals received from the pressure sensor, a second value of the differential pressure across the particulate filter when the exhaust back pressure valve is in the predetermined closed position;
calculating, by the processor, a difference between the second value and the first value; and
generating, by the processor, a signal that indicates a malfunction condition of the pressure sensor when the calculated difference is higher than a threshold pressure differential value.

9. The method according to claim 8, further comprising measuring, by the processor, the first value when an enabling engine condition is fulfilled.

10. The method according to claim 9, further comprising measuring, by the processor, a volumetric flow rate of the exhaust gas, wherein the enabling engine condition is fulfilled when the volumetric flow rate is greater than a threshold flow rate value.

11. The method according to claim 9, further comprising determining, by the processor, an engine speed, wherein the enabling condition is fulfilled when the engine speed is greater than a threshold engine speed value.

12. The method according to claim 8, further comprising determining, by the processor, a pressure value of the exhaust gas downstream of the exhaust back pressure valve and controlling, by the processor, the actuator to position the exhaust back pressure valve based on the pressure value.

13. The method according to claim 8, further comprising determining, by the processor, a volumetric flow rate of the exhaust gas, wherein the threshold pressure differential value is based on the volumetric flow rate of the exhaust gas.

14. The method according to claim 8, further comprising determining, by the processor, an engine speed, wherein the threshold pressure differential value is based on engine speed.

* * * * *